March 2, 1954 T. McG. AIKEN 2,670,667
CAMERA SHUTTER OF THE SLIDING TYPE
Filed June 25, 1951 2 Sheets-Sheet 1
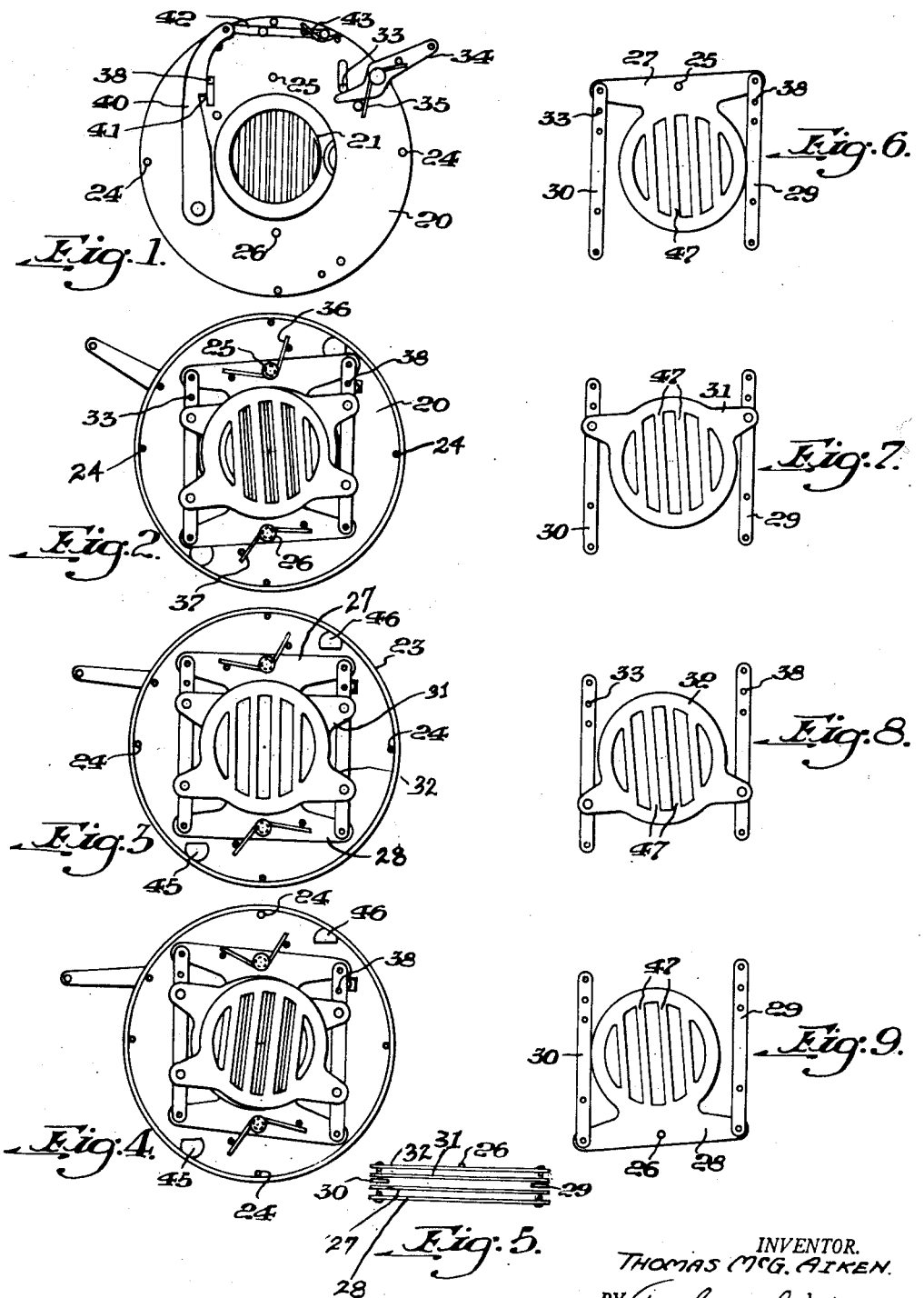
INVENTOR.
THOMAS McG. AIKEN.
BY Archworth Martin
his ATTORNEY.

INVENTOR.
THOMAS McG. AIKEN.
BY Archworth Martin
his ATTORNEY.

Patented Mar. 2, 1954

2,670,667

UNITED STATES PATENT OFFICE 2,670,667

CAMERA SHUTTER OF THE SLIDING TYPE

Thomas McG. Aiken, Pittsburgh, Pa.

Application June 25, 1951, Serial No. 233,350

7 Claims. (Cl. 95—56)

My invention relates to camera shutters, and more particularly to those of the grid type, wherein the exposures are made through relative sliding movements of the disc-like grids. The shutter apparatus may be in the form of a self-contained unit which may be attached to the lens barrel of a standard between-the-lens or iris shutter type of camera or used with other types of cameras. Also, the unit, of course, can be used alone as a shutter independently of another shutter.

One object of my invention is to provide a grid type shutter which will permit of wider exposure areas when in open position than is possible with various forms of grid shutters heretofore known.

Another object of my invention is to provide a grid type shutter wherein, for a given range of shutter movement, there is wider exposure opening during a given duration of shutter travel than in other types of grid shutters.

Still another object of my invention is to provide a grid shutter mechanism so arranged that there is counterbalancing or counteraction of the thrust forces produced through operation of the shutter, thus reducing wear and vibration.

A further object of my invention is to provide shutter apparatus of simple form that can readily be altered to employ various numbers of grid discs to thereby permit a desired exposure area through the shutter, depending upon the number of grids or discs used in the shutter and the widths of their bars.

Some of the forms which my apparatus may take are shown in the accompanying drawings, wherein:

Figure 1 is a rear view of the grid shutter unit, suitable for attachment to a shutter of the between-the-lens type;

Fig. 2 is a sectional view through the structure of Fig. 1, looking from the front of the shutter, but showing the shutter grids in spent or untensioned condition;

Fig. 3 shows the shutter grids at their intermediate positions, with their openings in alignment, when moving the shutter either toward set position or when the grids are moving from tensioned to spent position;

Fig. 4 shows the shutter mechanism tensioned ready for an exposure operation; Fig. 5 is a partly exploded edge view of the shutter apparatus of Figs. 1 to 4;

Figure 10:
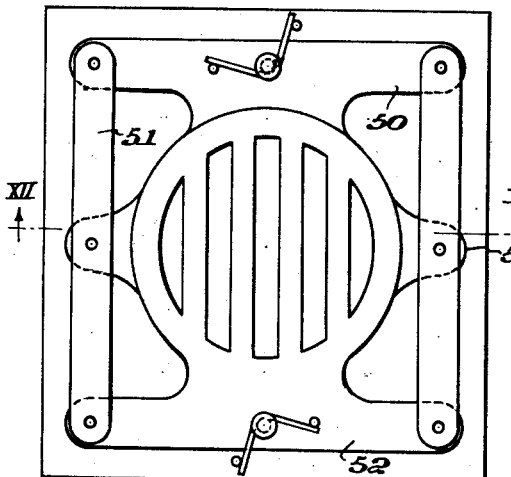
Figure 13:
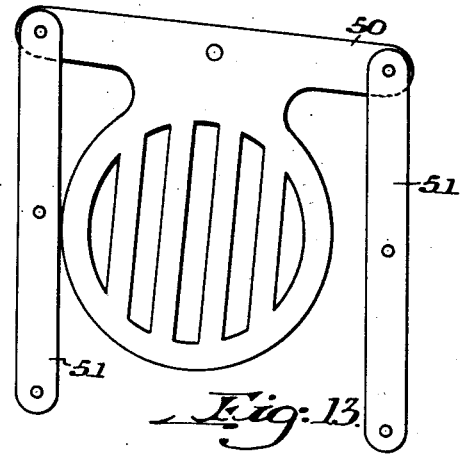
Figure 11:
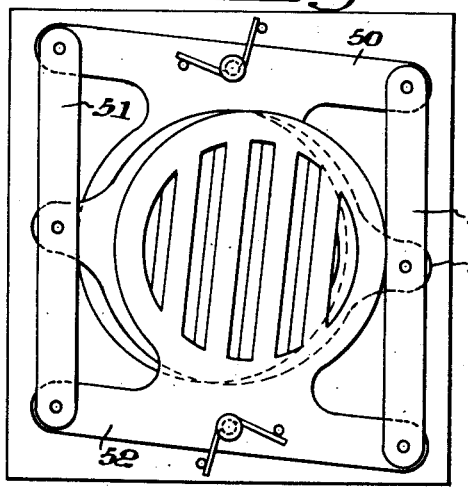
Figure 14:
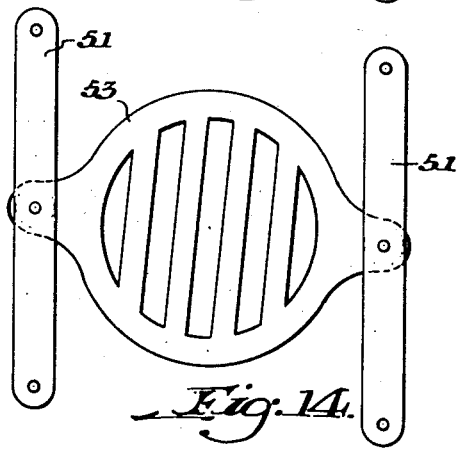
Figure 12:
Figure 15:
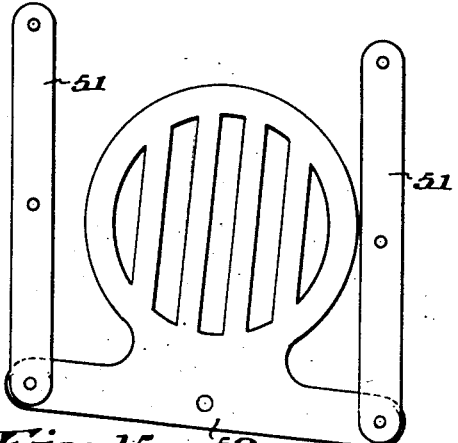
Figure 16:
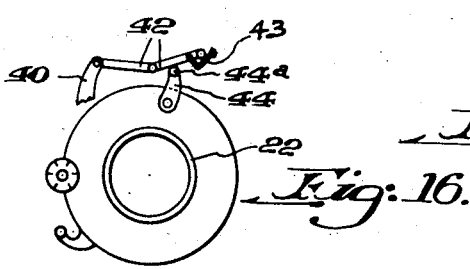

Figs. 6, 7, 8 and 9 respectively show the four disc-like grid members of the shutter of Figs. 1 to 4, together with connecting links therefor;

Fig. 10 shows a shutter arrangement similar to that of Figs. 2 to 4, but employing only three disc-like grids, with these grids at their intermediate or open positions;

Fig. 11 shows the shutter grids at their tensioned position; Fig. 12 is a view taken on the line XII—XII of Fig. 10;

Figs. 13, 14 and 15 show detailed views of the three grids of Figs. 1, 10 and 11, together with their connecting links, and Fig. 16 shows, on a reduced scale, a manner in which the grid shutter can be tripped or released when applied to an ordinary iris type shutter casing.

Referring first to Figs. 1 to 5, the shutter has a base 20 provided with a tubular portion 21 for attachment to the lens barrel 22 (Fig. 16) of an iris type shutter. The forward side of the casing 23 for the shutter will be closed by a cover plate (not shown) held in place by screws extending through a series of holes at 24.

A pair of studs are carried by the base 20 at 25 and 26 for pivotally supporting master grid members 27 and 28 respectively, for rocking movement on the base. Links 29 and 30 are pivotally connected at their upper and lower ends to the grid members 27 and 28 respectively. Intermediate grids 31 and 32 are pivotally supported by these links, so that when the grid member 27 is rocked as hereinafter explained, the grids 28—31—32 also will be rocked.

The link 30 has a stud 33 projecting therefrom and through the base plate 20, in position to be engaged by a tensioning lever 34 that is pivotally mounted on the base, so that the link and its associated grids can be rocked to place them under spring tension. The lever 34 is returned and yieldably held in its inoperative position by a spring 35.

Springs 36 and 37 respectively carried by the studs at 25 and 26 yieldably urge the grids toward their normally spent position as shown in Fig. 2. In order to set the shutter under tension ready for an exposure, the lever 34 will be rocked to move the stud 33 and its associated link in a direction to place the springs 36 and 37 under operating tension. When this tensioning movement is completed, a latch stud 38 that is carried by the link 29 has been moved downwardly along a latch bar 40 that has a retaining shoulder 41 for engagement with the stud 38 to hold the shutter under tension. During this movement, toggle links 42 pivoted at one end to the latch bar 40 and at the other end to the base plate 20, are moved to the broken position shown in Fig. 16, by a spring 43, this spring serving also to thereby hold the latch bar yieldably engaged with the stud 38.

Upon release of the latch at 38—41, the shutter members will be snapped from the set position of Fig. 4 to the spent position of Fig. 2. This tripping is here shown as effected through movement of the toggle links 42 from their broken position of Fig. 16 to their straight line position of Fig. 1, they thereby pushing the latch lever 40 clear of the stud 38. When the grid shutter is applied to a standard between-the-lens barrel as above suggested, the conventional setting lever 44 of the camera, when released through tripping of the iris shutter, will carry its knob 44a against the toggle links to push them toward a straight position and thereby push the latch bar 40 clear of the stud 38 when the iris shutter is about fully open. Shoulders 45 and 46 serve as stops for limiting the travel of the grids under released spring tension.

The grids will, of course, be made of quite thin material and will slide on one another during the operation of the shutter. By using four grids, I am enabled to make their flat-bar or strip-like portions 47 narrower than if say only two grids are employed. This enables the openings between the bars to be made much wider, with consequent wider exposure area through the shutter when the bars of the respective grids are all in relative axial alignment as in Fig. 3. The multiplicity of grids permits of good sealing of the shutter against transmission of light, notwithstanding the relatively wider spaces between the bars of each grid.

It will be seen that the movable shutter members are in what might be called parallel link arrangement, so that the bars of the various shutters are always in parallelism with one another. Also, the grids of Figs. 7 and 8 which are pivotally connected to the links 29 and 30 at points closer to the middle of the links than are the grids 27 and 28 have slow movement as compared to the other two grids, but their bars are nevertheless in axial alignment with the bars of the other grids when such other grids are at their mid position as shown in Fig. 3, and in moving past that position, they will be carried far enough to seal the grid openings in 27 and 28 (Fig. 2).

It is also to be noted that since the grid bars of grids 27 and 31 move in a direction opposite to the grids 28 and 32, there is what might be termed a balancing of shocks or thrust forces, thus causing the shutter to have longer life.

Referring now to Figs. 10 to 15, I show a sliding type shutter that employs but three grids. The mechanism for operating this shutter will be substantially the same as the mechanism shown in Figs. 1 to 4. However, in this form of device, while one master grid 50 is fastened to the upper ends of links 51 and another master grid 52 is fastened to the lower ends of said links similar to the manner in which grids 27 and 28 are mounted, there is but one intermediate grid, designated by the numeral 53, pivotally connected to the links 51 at their mid portions. When the grid 50 has been swung to the halfway point of its travel from one extreme position to its other extreme position, as from the tensioned or set position of Fig. 11, the bars of the various grids will be brought into alignment with one another, and the openings through the grids 50, 52 and 53 will be unobstructed at that stage of movement.

At either extreme position, the bars of the three grids will overlap to some extent, thus shutting off transmission of light through the shutter. Because only three grids are employed here, the grid bars have to be made somewhat wider and the openings consequently somewhat smaller than where four or more grids are employed.

In this connection, the use of the three grids gives about 55% efficiency in light transmission; a four-grid structure probably a little more than 60% efficiency, and a five-grid shutter would have probably 68% to 70% efficiency.

A five-grid structure could suitably be made by connecting two more grids to the links 51, at points between the middle of the links and their upper and lower ends. With such substitution, the bars of the grids could be considerably narrower than the bars of the three grids shown, with consequent wider passageways through the shutter.

I claim as my invention:

1. A camera shutter of the grid type, comprising a pair of grids, each comprising straight flat parallel-spaced bars, the grids being in relatively opposed planes, a base member pivotally supporting each grid adjacent to one end of its bars, and at a mid point along that edge of the grid that is remote from the edge at which the other grid is pivotally supported, links connecting the corners of each grid to the corners of the other grid, and forming, with the grids, a figure that is generally a parallelogram with the links generally parallel to the bars, whereby rocking movement of one of the grids on its pivot will be transmitted to the other grid, to rock it in a direction opposite to the first-named movement, and a third similarly-formed grid pivotally connected at its ends to points intermediate the ends of the links and having bars cooperating with the bars of the other grids, to close a lens aperture, the bars of all of the grids being parallel to one another and of such width that the various spaces between all of the bars will become closed, at each extreme position of rocking movements.

2. A camera shutter of the grid type, comprising a pair of grids, and each comprising straight flat parallel spaced bars, the grids being in relatively opposed planes, a base member pivotally supporting each grid adjacent to one end of its bars, and at a mid point along that edge of the grid that is remote from the edge at which the other grid is pivotally supported, links connecting the corners of each grid to the corners of the other grid, and forming, with the grids, a figure that is generally a parallelogram, with the links generally parallel to the bars, whereby rocking movement of one of the grids on its pivotal will be transmitted to the other grid, to rock it in a direction opposite to the first-named movement, and a plurality of similarly-formed grids pivotally connected at their ends to the links, at intermediate points symmetrically spaced with respect to the ends of each link, the bars of the grids being all parallel to one another and of such width that the various spaces between all of the bars will become closed, at each extreme position of rocking movements.

3. A camera shutter of the grid type, comprising a pair of grids, each of straight flat parallel-spaced bars, means for pivotally supporting the grids in relatively opposed planes, at mid points along their relatively remote edges, and each at a point adjacent to one end of its bars, for oscillation about axes perpendicular to said planes, a pair of links respectively connected to the grids at opposite relatively remote edges thereof, adjacent to corners of the grids and disposed generally parallel to the bars, whereby oscillatory movement of one grid will effect oscillations of the other grid, and a third similarly-formed grid in a plane opposed to one of the other grids and having pivotal connection at each end with a mid portion of the respective links, the bars of the grids being all parallel to one another and of such width that the various spaces between all of the bars will become closed, at each extreme position of rocking movements.

4. A camera shutter of the grid type, comprising a pair of grids, each comprising straight flat parallel-spaced bars, the grids being in relatively opposed planes, a base member pivotally supporting each grid adjacent to one end of its bars, and at a mid point along that edge of the grid that is remote from the edge at which the other grid is pivotally supported, links connecting the corners of each grid to the corners of the other grids, and forming, with the grids, a figure that is generally a parallelogram with the links generally parallel to the bars, whereby rocking movement of one of the grids on its pivotal will be transmitted to the other grid, to rock it in a direction opposite to the first-named movement, a third similarly-formed grid pivotally connected at its ends to points intermediate the ends of the links and having bars cooperating with the bars of the other grids, to close a lens aperture, the bars of all of the grids being parallel to one another and of such width that the various spaces between all of the bars will become closed, at each extreme position of rocking movements, a tensioning spring for the grids, and a releasable latch for holding the grids and their connecting links under operating tension, the bars of the grids being of such width that the various spaces between all of the bars will become closed, at each extreme position of rocking movements.

5. A camera shutter of the grid type, having a base plate provided with an opening therethrough, a grid of straight flat parallel-spaced bars pivotally supported on said plate at a point of its edge adjacent to one end of its bars, and extending across the opening, a second similarly-formed grid pivotally supported on the base, at a point diametrally opposite to the first-named pivot and extending across the opening, links connecting the grids and disposed generally parallel to the bars, to either side of each of said pivotal supports so that the grids can be rocked in unison, a tensioning spring of each grid, to rock it from one extreme position to the other extreme position, the springs cooperating with each other and positioned to act upon their respective grids, at opposite sides of a line drawn through said pivotal supports, and a third grid formed similarly to the other grids, and pivotally connected at its ends to intermediate ends of the links, the bars of the grids being all parallel to one another and of such width that the various spaces between all of the bars will become closed, at each extreme position of rocking movements.

6. A camera shutter of the grid type, comprising a pair of grids each comprising straight flat parallel bars, the grids being in relatively opposed planes, a base member pivotally supporting each grid adjacent to one end of its bars and at a mid point along that edge of the grid that is remote from the edge at which the other grid is pivotally supported, links connecting the corners of each grid to the corners of the other grid and disposed generally parallel to the bars of the grids, and forming, with the grids, a figure that is generally a parallelogram, whereby rocking movement of one of the grids on its pivot will be transmitted to the other grid, to rock it in a direction opposite to the first-named movement, a tensioning spring for holding the said grid and link elements under operating tension, a latch bar pivoted on the base, a stud carried by one of said elements in position to be releasably held by the latch bar when the elements are placed under operating tension, a toggle link device for moving the latch bar out of operative position with respect to the said stud, to release the tensioned elements, the toggle being in a partly bent position when the latch members are in engagement with each other, a spring for yieldably maintaining the toggle in latch-holding position, and a third similarly-formed grid whose bars are parallel to the bars of the other grids and which is pivotally connected to the links at points intermediate the said corners, the bars of the grids being of such width that the various spaces between all of the bars will become closed, at each extreme position of rocking movements.

7. A camera shutter of the grid type comprising at least three grids each of flat parallel spaced bars, the grids being arranged in opposed planes, means for pivotally supporting two of the grids intermediate their ends, the two points of support being located adjacent to the ends of the grid bars and at diametrically opposite points with respect to the mid point of the shutter, links generally parallel to said bars and pivotally connecting the ends of the various grids to the ends of the other grids, there being one link at each end of the grids, to form parallelograms, each grid other than said two pivotally supported grids being pivotally connected to each of said links at points intermediate the connection of said links to said two pivotally supported grids, stops limiting the range of rocking movements of the grids on their pivots, the bars of each grid all extending approximately parallel to the bars of the other grids, and being of such total width that when the assembly is oscillated on the pivotal supports for the said two grids, the spaces between the various grid bars will be closed, at an extreme position of rocking movement.

THOMAS McG. AIKEN.

References Cited in the file of this patent

UNITED STATES PATENTS

| Number | Name | Date |
| --- | --- | --- |
| 689,982 | Morgan | Dec. 31, 1901 |
| 1,274,262 | Gruss | July 30, 1918 |
| 1,751,808 | Gauthier | Mar. 25, 1930 |
| 2,322,733 | Steiner | June 22, 1943 |
| 2,345,365 | Steiner | Mar. 28, 1944 |
| 2,378,207 | Fuller | June 12, 1945 |

FOREIGN PATENTS

| Number | Country | Date |
| --- | --- | --- |
| 11,789 | Great Britain | of 1893 |
| 570,422 | Germany | Feb. 16, 1933 |